United States Patent
Matsubayashi

(10) Patent No.: US 7,217,195 B2
(45) Date of Patent: May 15, 2007

(54) METHOD OF PRODUCING LEFT-RIGHT SCREW

(75) Inventor: Kou Matsubayashi, Nagoya (JP)

(73) Assignee: Yugen Kaisha Art Screw, Nagoya-shi, Aichi (JP)

( * ) Notice: Subject to any disclaimer, the term of this patent is extended or adjusted under 35 U.S.C. 154(b) by 0 days.

(21) Appl. No.: 10/567,955

(22) PCT Filed: Aug. 9, 2004

(86) PCT No.: PCT/JP2004/011440

§ 371 (c)(1),
(2), (4) Date: Feb. 10, 2006

(87) PCT Pub. No.: WO2005/014194

PCT Pub. Date: Feb. 17, 2005

(65) Prior Publication Data

US 2006/0236740 A1    Oct. 26, 2006

(30) Foreign Application Priority Data

Aug. 12, 2003 (JP) ............... 2003-323741
Feb. 20, 2004 (JP) ............... 2004-079193

(51) Int. Cl.
*B21H 3/02*    (2006.01)
(52) U.S. Cl. .................. 470/10; 470/66; 470/185

(58) Field of Classification Search ............ 72/88, 72/90, 103; 470/10, 12, 66, 70, 84, 85, 185; 411/412, 413
See application file for complete search history.

(56) References Cited

U.S. PATENT DOCUMENTS

| | | | | | |
|---|---|---|---|---|---|
| 2,419,555 | A | * | 4/1947 | Fator | 411/387.3 |
| 3,260,100 | A | * | 7/1966 | Wieber | 72/469 |
| 3,600,981 | A | * | 8/1971 | Wagner | 76/107.1 |
| 3,854,350 | A | * | 12/1974 | Bauer et al. | 76/107.1 |
| 5,569,009 | A | * | 10/1996 | Suzuki | 411/413 |
| 6,957,557 | B2 | * | 10/2005 | LeVey | 72/88 |

FOREIGN PATENT DOCUMENTS

| | | |
|---|---|---|
| JP | 2866462 | 12/1998 |
| JP | 11-25472 A | 9/1999 |
| JP | 2003-184848 A | 7/2003 |

* cited by examiner

*Primary Examiner*—Ed Tolan
(74) *Attorney, Agent, or Firm*—Matthew K. Ryan; Frommer Lawrence & Haug LLP

(57) ABSTRACT

The present invention provides a method for manufacturing a right- and left-hand screw having a first external right-handed thread and a second external left-handed thread formed by an inexpensive rolling process using a rolling die with a first thread-cutting die for the first thread and a second thread-cutting die for the second thread.

3 Claims, 4 Drawing Sheets

METHOD OF PRODUCING LEFT-RIGHT SCREW

This application is a 35 USC 371 of PCT/JP04/11440 filed Aug. 9, 2004.

TECHNICAL FIELD

The present invention relates to the method for manufacturing the right-and-left screw with both right- and left-hand threads that overlap on the same screw surface.

BACKGROUND ART

The right-and-left screw is known as a screw type that prevents from loosening. The right-and-left screw forms both external right- and left-hand threads overlapping on the same screw surface. The right-and-left screw is equipped with two nuts, a right screw nut corresponding to the right-hand thread and a left screw nut corresponding to the left-hand thread. The right-and-left screw fastens the object to be joined by rotating the two screw nuts in opposite directions and jamming them tight.

It is impossible for vibration to rotate two nuts to its opposite direction. The two jam nuts can only rotate to the same direction which causes them tighten. Therefore any vibration will not loosen from the original fastening condition.

DISCLOSURE OF INVENTION

The right-and-left screw is theoretically a perfect device that will not loosen. The right-and-left screw has possible multiple industrial applications. It is necessary to meet specifications for effective diameters in both external right- and left-hand threads while being able to supply inexpensive the right-and-left screw.

Theoretically speaking, it is understandable to have both functions of the external right-hand and the external left-hand threads on the same screw surface. Realistically speaking, however, there are some challenges yet to be solved on forming overlapping both external right- and left-hand threads in the manufacturing of the right-and-left screw. Furthermore, the both threads of the right-and-left screw need to be inspected separately.

The conventional manufacturing process for the right-and-left screw has two separate rolling processes, the first to form the external right-hand thread and then the second to form the external left-hand thread. The surface pressure must be kept constant between the processed surface and the rolling die. It is, however, not possible to maintain the exact pressure once the external right-hand thread is cut in the first process. Due to the inconsistency, the external right-hand threads are often stripped during the second process and the external left-hand threads are not formed precisely. Therefore it is difficult to make threads per JIS, Japanese Industrial Standards by a conventional manufacturing method and practically impossible to manage the effective diameters meeting Japanese Industrial Standards by a limit gauge. A related literature to this invention is disclosed in Japanese Patent No. 2866462.

The purpose of the present invention is to provide a simple yet effective method for manufacturing the right- and left-hand threads as a theoretically perfect anti-loosening device and with stable quality.

The above-mentioned need is achieved by the present invention. A method for manufacturing a right-and-left screw having a first external thread and a second external thread formed reversely and having a smaller pitch from said first external thread, and a first internal thread mounted on said first external thread and a second internal thread mounted on said second external thread, and said method simultaneously makes said first external thread and said second external thread by rolling a screw material by use of a thread rolling die having a first thread cutting blade for said first external thread and a second thread cutting blade for said second external thread on the same surface, wherein a diameter of said screw material is smaller than a diameter of screw material generally using only for said first external thread.

Generally speaking, in the rolling processes, the diameter of the screw material wigh stick like shape is reduced as a pitch of the screw increasing. The reason being that the screw material of the stick subjected to be rolled and cut is moved along the shape of the die when the stick is rolled and the thread is shaped on the surface thereof.

From the viewpoint of the present invention, the pitch of the first external thread is bigger than that of the second external thread. In a case where making only the first or second thread on the screw material, the relation is displayed as follows, the diameter of the screw material for the first external thread <the diameter of the screw material for the second external thread. It is assumed that the screw material with a small diameter according to the first external thread absorbs a material relief in making the second external thread when the first and second threads are shaped simultaneously.

According to an examination by an inventor of the present invention, however, it was not be able to make the right-and-left screw with the effective diameter when the first external thread and the second external thread is shaped, simultaneously, on the screw material generally using only for the first external thread. The reason is assumed that a material of screw needs to be removed from a screw section other than the screw section overlapped by the first external thread and the second external thread.

Therefore, the diameter of the screw material is reduced to be smaller than that of the screw material generally used only for the first external thread, it is able to make the right-and-left screw with the effective diameter as intended. The ratio of the reduced diameter is able to be definable in accordance with the pitch, the height of the first external thread and the second external thread, the diameter of the screw material itself. According to an examination by the inventor of the present invention, it is preferred that the ratio of the reduced diameter is from 0.1 to 3.0%. It was difficult to make the right-and-left screw with the effective diameter out of that ratio range. The diameter of the screw material is reduced over 3.0%, the effective diameter of the right-and-left screw becomes smaller than the effective diameter of the specification such as JIS and the ratio of the reduced diameter is less than 0.1%, the effective diameter of the right-and-left screw become bigger than the effective diameter of JIS.

BEST MODE FOR CARRYING OUT THE INVENTION

Figure 1:
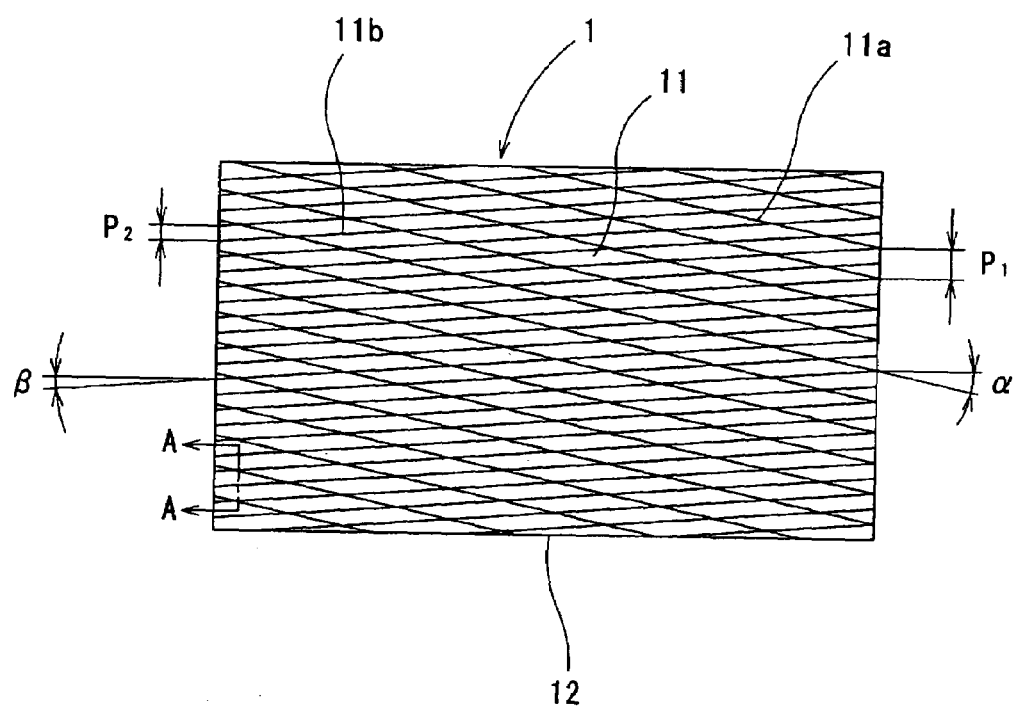
FIG. 1 is an elevation view of a cutting face of a rolling die in this embodiment of the present invention.

One embodiment according to the present invention will be described using FIG. 1. FIG. 1 illustrates a thread cutting surface of a rolling die relates to the present invention. In a thread cutting plane 11 of a rolling die 1, a cutting blade 11a for making some external right-handed threads having a lead angle alpha and a thread pitch P1 and a cutting blade 11b for making some external left-handed thread having a lead angle beta and a thread pitch P2 are shaped on the same cutting surface.

While the lead angle alpha, the thread pitch P1, the lead angle beta and the thread pitch P2 are set to any size, preferably the thread cutting blade 11a for making the external right-handed thread (a first external thread) is set to the same size to a coarse thread of JIS (Japanese Industrial standards) and the thread cutting blade 11b for making the external left-handed thread (a second external thread) is set to the same size to a fine coarse thread die of JIS (the pitch is smaller than the coarse thread's pitch). As referred above, it has achieved a function of preventing the screw from loosing effectively by combining different pitch of the threads, the coarse thread and the fine coarse thread.

The height of the first thread is same as the height of the second thread for the right-and left screw by reason that two nuts are threadably mounted on the right-and-left screw.

Figure 2:
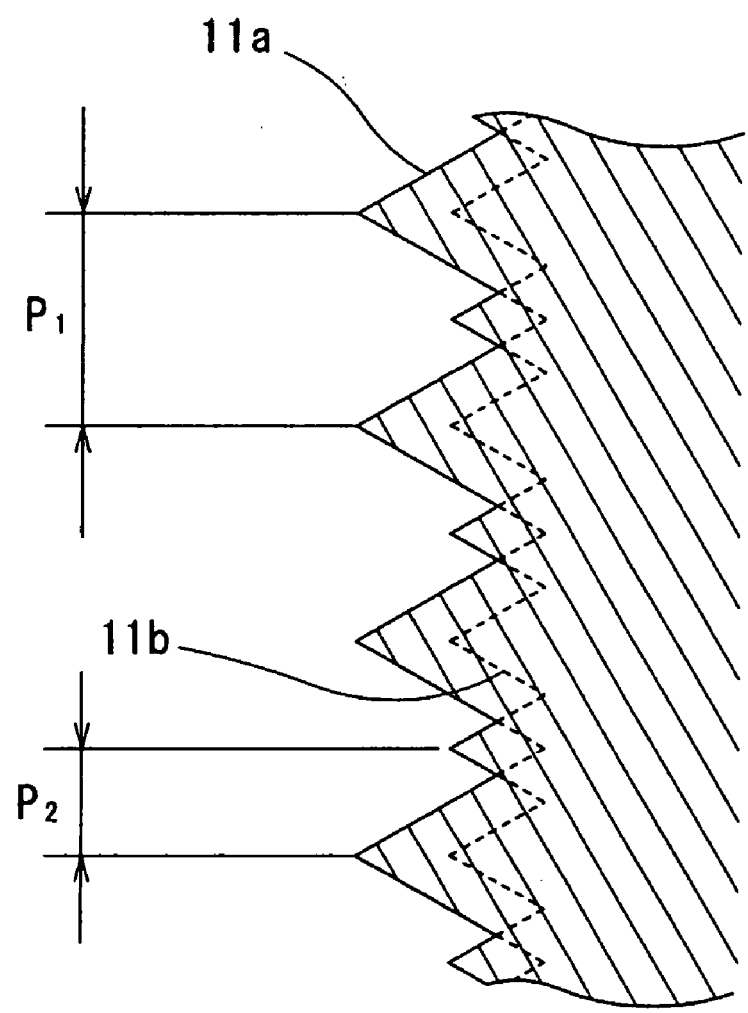
FIG. 2 is a cross sectional view taken along a line A-A of the rolling die in FIG. 1.

FIG. 2 illustrates a cross-sectional view of the A-A section of the rollilng die. In the drawing, a cross-sectional shape of the rolling die is a solid line in the FIG. 2 and the outline of the thread cutting blade 11a for the external right-handed thread and the outline of the thread cutting blade 11b for the external left-handed thread are combined and projected to the vertical direction of the cross-section.

In addition, a crest of the thread and a root of the thread are optionally able to be rounded.

Using a pair of the rolling dies 1 each having the thread cutting plane 11, the rolling dies are relatively displaced to the parallel direction of a bottom surface 12. A stick-like shaped screw material is set and rolled with a pressure between the thread cutting planes and thereby right and left threads are shaped simultaneously on an outside surface of the screw material as its rotation.

In this embodiment, a major diameter of the right-handed coarse thread is 10 mm and a pitch of the coarse thread is 1.5 mm (M10XP1.5) and a major diameter of the fine coarse thread is 10 mm and a pitch of the fine coarse thread is 0.75 mm (M10XP0.75). The diameter of the screw material generally using only for the M10XP1.5 coarse thread is approximately from 8.91 to 8.97 mm and the diameter of the screw material of this embodiment was from 8.78 to 8.83 mm. The diameter of this screw material of the embodiment is approximately 98% of the diameter of the general screw material and a ratio of the reduced diameter is approximately 2%.

In this moment, the ratio of the reduced diameter becomes decreased as making the pitch of the left-handed fine coarse thread smaller and the ratio for the compressed diameter become increased as making the pitch of the left-handed fine coarse thread bigger.

Figure 3:
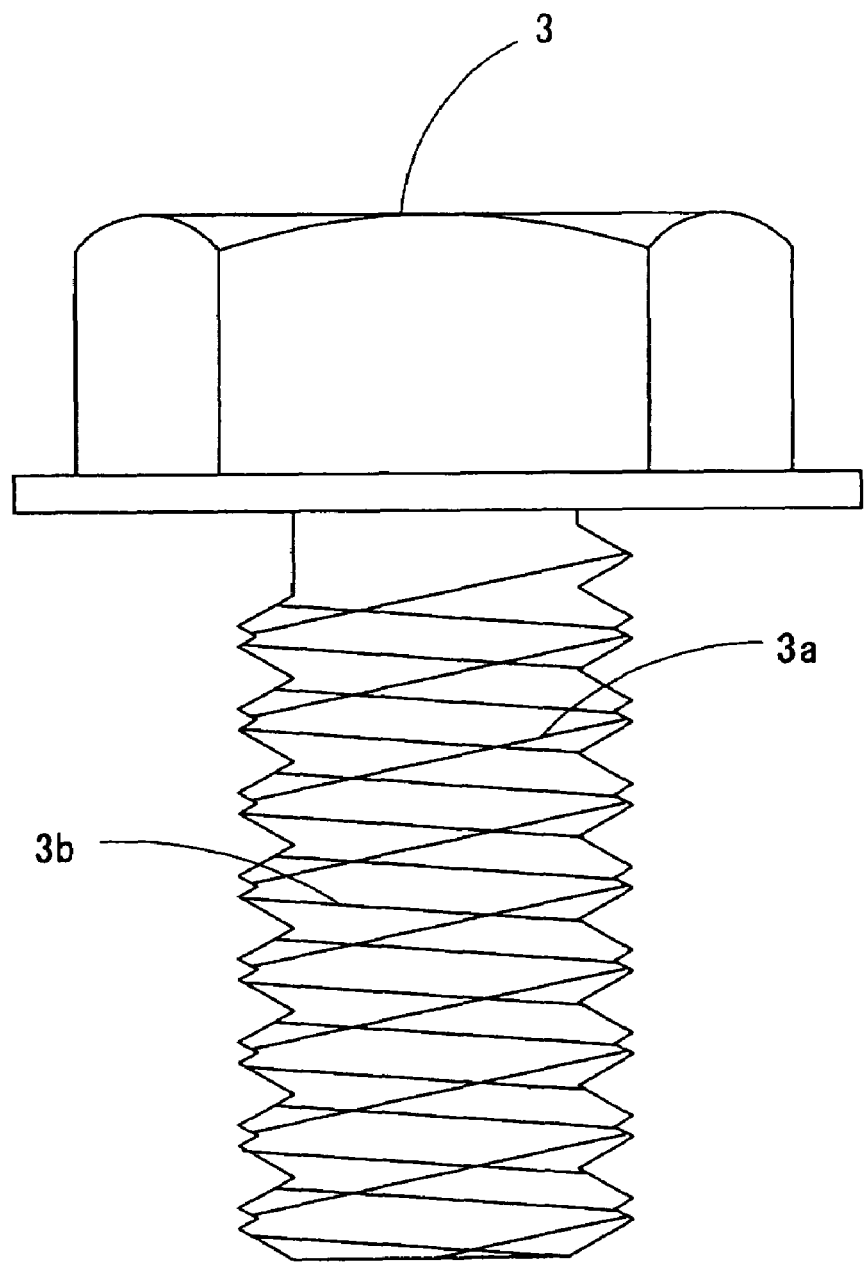
FIG. 3 is an elevation view of a right-and-left screw of this invention.

FIG. 3 shows a side view of the right-and-left screw made by the rolling die illustrated in FIG. 1. Illustrated in FIG. 3, an external right-handed thread 3a and an external left-handed thread 3b are redundantly shaped on the same surface.

Figure 4:
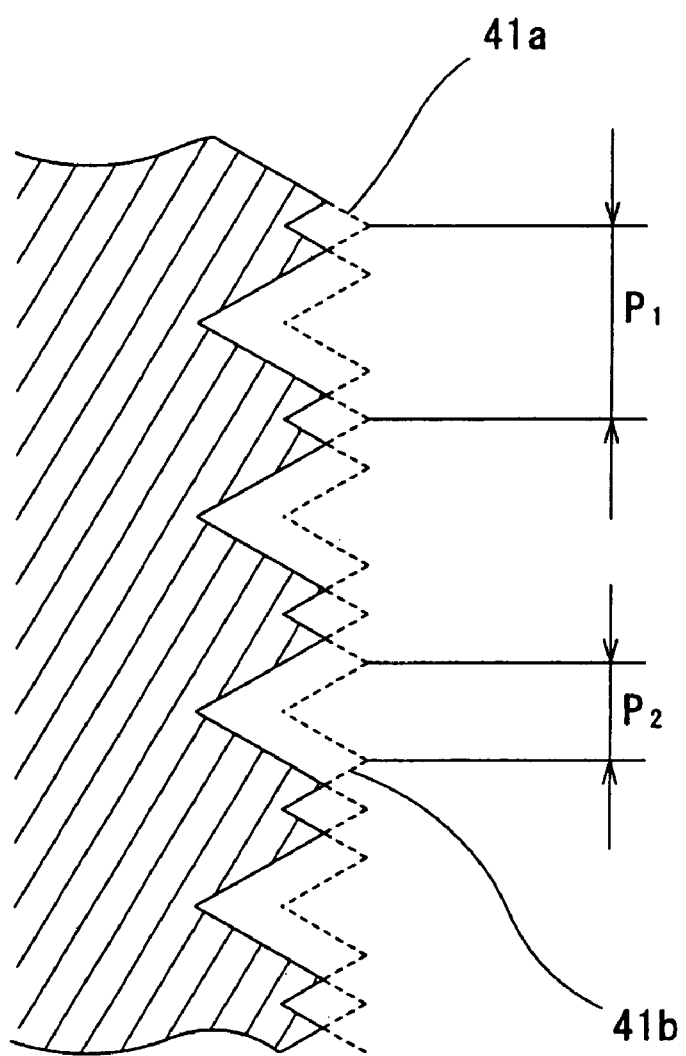
FIG. 4 is a cross sectional view of the right-and-left screw showing a shape of the thread in FIG. 1.

FIG. 4 is a cross-sectional drawing showing the shape of a right-and-left screw 3. The cross-sectional shape of the right-and-left screw 3 is a solid line in the FIG. 4 and the outline of a thread shape 41a for the external right-handed thread with pitch P1 and the outline of a thread shape 41b for the external left-handed thread with pitch P2 are combined and shaped the outline of the right-and-left screw 3.

In addition, the rolling die of this embodiment is a flat die and it is able to be used to a cylindrical die.

INDUSTRIAL APPLICABILITY

As referred above, in manufacturing the right-and-left screw, the present invention is simultaneously able to shape the external right-handed thread and the external left-handed thread on the same processed surface with respect to each rotation using the rolling die having the cutting blade for the external right-handed-thread and the cutting blade for the external left-handed thread on the same surface, therefore, it is possible to manufacture the right-and-left screw having the shaped thread the same form as the rolling die and, for example, meets the effective diameter of JIS. And the cross-sectional shape of this rolling die is that the outline of the thread cutting blade for the external right-handed thread and the outline of the thread cutting blade for the external left-handed thread are combined and projected to the vertical direction of the cross-section and the cross-sectional shape of the right-and-left screw made by the rolling die has the shape which includes the outline of a thread shape for the external right-handed thread and the outline of a thread shape for the external left-handed thread, therefore, there is no intervention from the external left-handed thread in the inspection for the external right-handed thread and there is no intervention from the external right-handed thread in the inspection for the external the left-handed thread and it is possible to inspect the thread by such as JIS and to secure the stable quality of the right-and-left screw.

In the method for manufacturing the right-and-left screw by the thread cutting process, the present invention simultaneously meets each effective diameter standard for the external right-handed thread and the external left-handed thread and this is the first case in the world and, therefore, it is possible to manufacture the right-and-left screw of the same standard stably in the screw manufactory all around the world.

The invention claimed is:

1. A method for manufacturing a right- and -left-hand screw having a first external thread and a second external thread formed reversely, said second external thread having a smaller pitch than said first external thread, said method simultaneously forms said first external thread and said second external thread by rolling a screw material by use of a rolling die having a first thread cutting blade for said first external thread and a second thread cutting blade for said second external thread on the same surface, wherein a diameter of said screw material is smaller than a diameter of screw material generally used only for said first external thread.

2. The method for manufacturing a right- and -left-hand screw in accordance with claim 1, wherein the reduced ratio of the diameter of said screw material is 0.1 to 3.0% with respect to said diameter of screw material generally used only for said first external thread.

3. The method for manufacturing a right- and -left-hand screw in accordance with claim 1, wherein said first external thread is a coarse thread and second external thread is a fine thread.

\* \* \* \* \*